(12) United States Patent
Monnerat

(10) Patent No.: US 8,018,988 B2
(45) Date of Patent: Sep. 13, 2011

(54) METHOD OF VALIDATING THE DETECTION OF A CORRELATION PEAK BY A SATELLITE POSITIONING SYSTEM RECEIVER

(75) Inventor: Michel Monnerat, Toulouse (FR)

(73) Assignee: Alcatel Lucent, Paris (FR)

( * ) Notice: Subject to any disclaimer, the term of this patent is extended or adjusted under 35 U.S.C. 154(b) by 1329 days.

(21) Appl. No.: 10/568,742

(22) PCT Filed: Jul. 7, 2004

(86) PCT No.: PCT/FR2004/001776
§ 371 (c)(1),
(2), (4) Date: Oct. 2, 2006

(87) PCT Pub. No.: WO2005/022188
PCT Pub. Date: Mar. 10, 2005

(65) Prior Publication Data
US 2007/0242733 A1 Oct. 18, 2007

(30) Foreign Application Priority Data
Aug. 22, 2003 (FR) ...................................... 03 10093

(51) Int. Cl.
*G01S 5/14* (2006.01)
(52) U.S. Cl. ......... 375/150; 375/371; 375/367; 370/516
(58) Field of Classification Search ................... 375/150, 375/371, 367; 370/516
See application file for complete search history.

(56) References Cited

U.S. PATENT DOCUMENTS

| | | | |
|---|---|---|---|
| 5,373,298 A | 12/1994 | Karouby | |
| 5,815,539 A | 9/1998 | Lennen | |
| 5,963,601 A * | 10/1999 | Pon et al. | 375/346 |
| 2002/0172307 A1* | 11/2002 | Sandberg | 375/344 |
| 2003/0081659 A1* | 5/2003 | Yousef et al. | 375/148 |

FOREIGN PATENT DOCUMENTS

| | | |
|---|---|---|
| DE | 4114058 C2 | 11/1992 |
| EP | 0592307 | 10/1993 |

\* cited by examiner

*Primary Examiner* — Shuwang Liu
*Assistant Examiner* — Michael Neff
(74) *Attorney, Agent, or Firm* — Fay Sharpe LLP

(57) ABSTRACT

The present invention relates to a method of validating the detection of a correlation peak between a signal transmitted by a plurality of navigation satellites and received by an RNSS satellite radio navigation receiver, said signal corresponding to a sum of signals each sent by a satellite and each modulated by a spread spectrum signal characteristic of said satellite and a local replica generated by said receiver of a spread spectrum signal characteristic of a satellite that is being looked for. Said method includes a step of determining the correlation function 3 as a function of time between said received signal and said local replica and further includes a step of comparing said correlation function 3 with the theoretical autocorrelation function 2 as a function of time of said spread spectrum signal characteristic of said satellite that is being looked for.

8 Claims, 2 Drawing Sheets

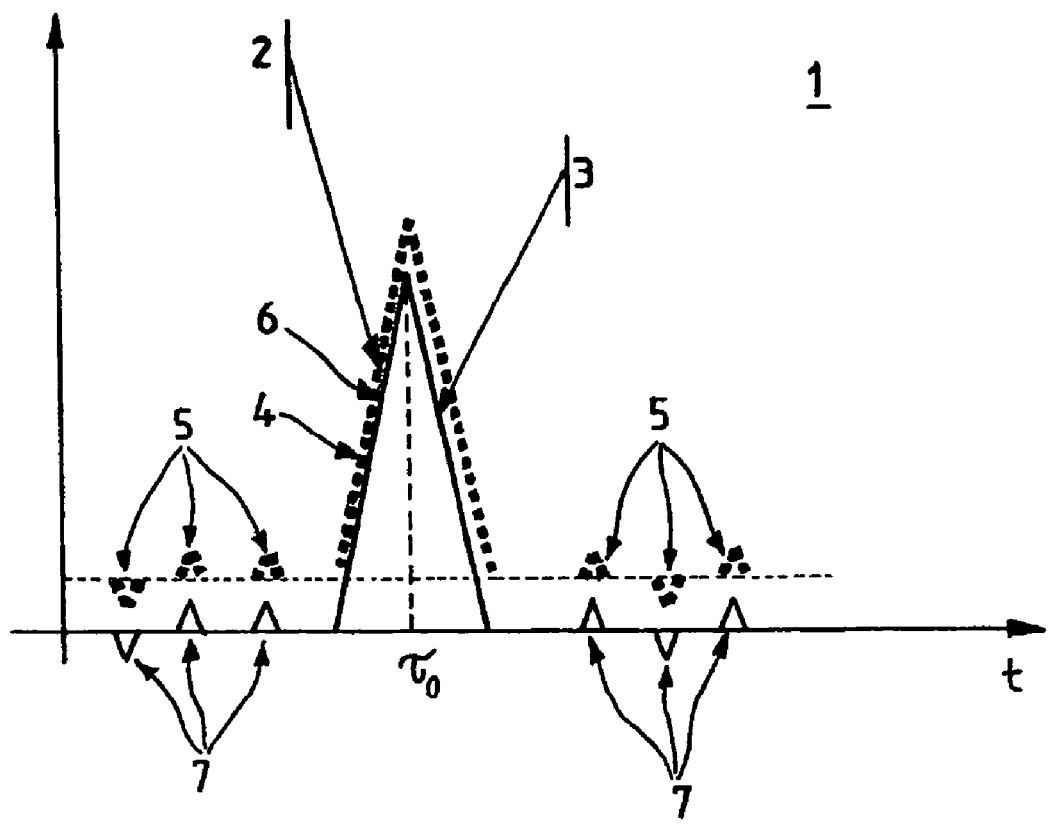
FIG_1

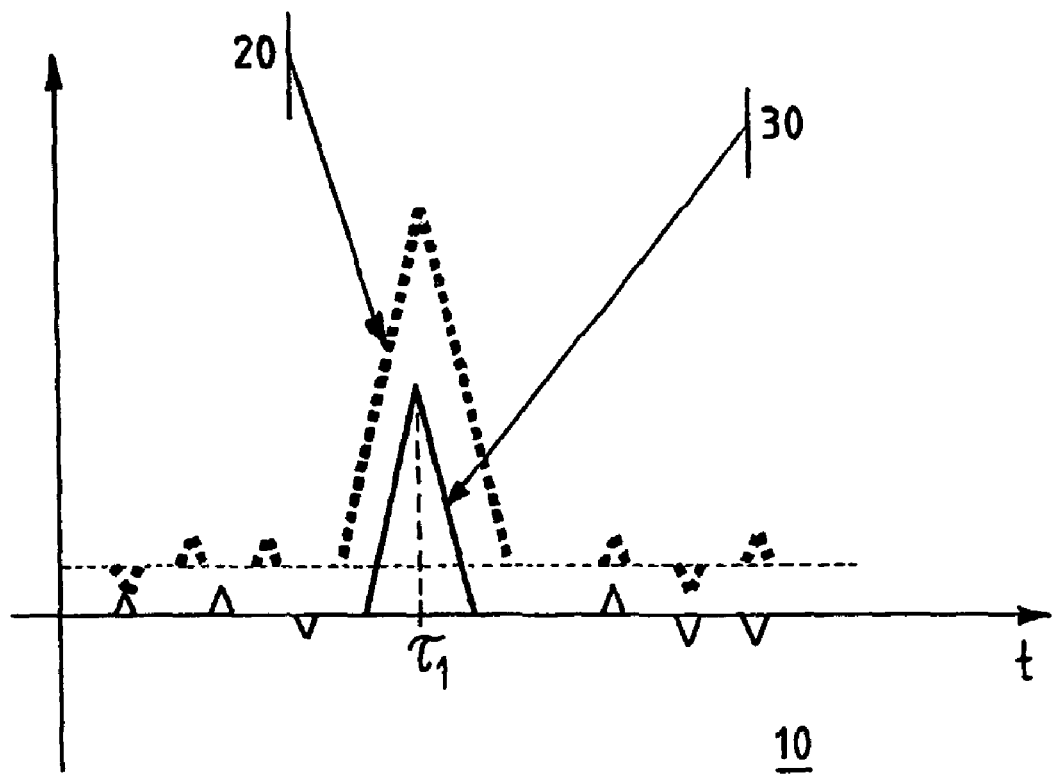
FIG_2

METHOD OF VALIDATING THE DETECTION OF A CORRELATION PEAK BY A SATELLITE POSITIONING SYSTEM RECEIVER

The present invention relates to a method of validating the detection of a correlation peak by a satellite positioning system receiver.

In a satellite positioning system using radio navigation satellite system (RNSS) type receivers, such as a Global Positioning System (GPS) or GLONASS receiver, the data signals used to calculate the position of the receiver come from different satellites (at least four satellites to determine four unknowns x, y, z and t).

The GPS signal transmitted by each of the satellites is based on a spread spectrum technique. Accordingly, the signal is a binary data signal modulated by a spread spectrum signal by a code division multiple access (CDMA) method. In other words, each bit of the data signal is replaced by a spreading sequence specific to each satellite. The data is transmitted serially at 50 bit/s (50 bit/s is 0.02 s/bit). A spreading sequence such as a Gold pseudorandom sequence is transmitted at a much higher rate: a Gold sequence may be considered as a series of bits with a clearly defined clock period; the expression "code moment" or its more frequently encountered equivalent "chip" refers to a bit of the sequence and, by extension, the duration thereof. The spreading sequence is transmitted at a rate of 1.023 Mchip/s (thus a chip has a duration of approximately 1 µs) and comprises 1023 chips (and has a duration of 1 ms): there are therefore 20 sequence repetitions per data bit.

Modulation by the spread spectrum signal means that a normal demodulator will see the received signal as noise.

Generally speaking, the correlation function $f(\tau)$ of two signals $f_i(t)$ and $f_j(t)$ is given by the equation:

$$f(\tau) = \int_{+\infty}^{-\infty} f_i(t) \cdot f_j(t-\tau) \cdot dt,$$

in which $\tau$ denotes a variable time. Of course, in practice, the integration is not effected from $-\infty$ to $+\infty$, but over a finite time period, the integral being divided by the duration of said period. The expression "autocorrelation function" is appropriate when the functions $f_i(t)$ and $f_j(t)$ are identical and the expression "intercorrelation function" is appropriate when the functions $f_i(t)$ and $f_j(t)$ are different.

Each satellite k has its own pseudorandom signal $C_k(t)$. Each of these pseudorandom signals has the following property: its autocorrelation function is zero except in the vicinity of the zero time shift, where it assumes a triangular form; in other words, the integral $$\int_{+\infty}^{-\infty} C_k(t) \cdot C_k(t-\tau) \cdot dt$$

is zero when $\tau$ is non-zero and is at a maximum when $\tau$ is zero.

Furthermore, the signals each associated with a different satellite are selected so that their intercorrelation function is zero; in other words, the integral $$\int_{+\infty}^{-\infty} C_k(t) \cdot C_{k'}(t-\tau) \cdot dt$$

is zero regardless of $\tau$ when k and k' are different.

The spread spectrum signals from the satellites are therefore selected to be orthogonal.

When the receiver seeks to acquire the data from a particular satellite, the receiver correlates the received signal with a replica of the pseudorandom sequence of the satellite concerned (the sequence of the satellite is assigned to it once and for all and does not change during the life of the satellite).

Thus the received signal S(T) is the sum of the set of signals transmitted by each satellite:

$$S(t) = \sum_{k=1}^{n} C_k(t) \cdot d_k(t),$$

where n is the number of satellites, $C_k(t)$ denotes the spread spectrum signal from the satellite k and $d_k(t)$ denotes the data from the satellite k.

In seeking to acquire the data from the satellite m, the local replica will correspond to the signal $C_m(t)$. Accordingly, after correlation, and assuming that the spreading signals are perfectly orthogonal, all of the data from the satellites that are not being looked for is eliminated (the intercorrelation functions are zero), leaving only the data from the satellite m. Correlation is possible because the duration of a spreading sequence is twenty times smaller than the duration of a data bit.

The signal acquisition phase consists in calculating the correlation of the received signal with the local replica of the required satellite code over a time domain equivalent to the period of the code, which is 1 ms, with a depth (limit of the integral) depending on the detection performance required.

However, using a solution of the above kind gives rise to certain difficulties.

Thus in practice the spread spectrum signals from the satellites are never perfectly orthogonal. This being the case, the intercorrelation functions give rise to correlation peaks. These correlation peaks are generally more than −24 dB below the autocorrelation peak. However, if a satellite that is not being searched for has a high transmission power (of the order of 24 dB above that of the satellite that is being looked for), it may happen that a secondary peak of the intercorrelation function is higher than the main peak of the autocorrelation function that is being looked for. A situation of this kind may arise in particular in spaces where radio wave propagation is subject to interference (typically in urban areas and inside buildings). This correlation peak detection error leads to a detection error (and therefore to a synchronization time error), as the validated correlation peak does not correspond to the satellite that is being looked for. This kind of error obviously has an immediate impact on location accuracy.

The present invention aims to provide a method of validating the detection of a correlation peak that confirms or invalidates the detection of the correlation peak that retains the existing spread spectrum signals and consequently relaxes the orthogonality constraints imposed on the design of the signal family when designing the satellite navigation system.

To this end the present invention proposes a method of validating the detection of a correlation peak between:

a signal transmitted by a plurality of navigation satellites and received by an RNSS satellite radio navigation receiver, said signal corresponding to a sum of signals each sent by a satellite and each modulated by a spread spectrum signal characteristic of said satellite, a local replica generated by said receiver, said replica being the replica of a spread spectrum signal characteristic of a satellite that is being looked for, said method including a step of determining the correlation function as a function of time between said received signal and said local replica, said method being characterized in that it further includes a step of comparing said correlation function with the theoretical autocorrelation function as a function of time of said spread spectrum signal characteristic of said satellite that is being looked for over the whole of the vector of the correlation function.

Thanks to the invention, once the main peak has been detected, a verification is performed that compares the correlation function obtained from the received signal with the theoretical autocorrelation function. The main peak corresponds to the highest peak of the calculated correlation function. In practice, detecting the main peak of the correlation function enables an assumed synchronization time to be determined. The theoretical autocorrelation function is calculated to obtain a main peak centered on the synchronization time. The two functions therefore have a main peak around the assumed synchronization time. The two functions also have secondary peaks or lobes. By comparing the secondary peaks, that is to say by verifying whether they occur at the same time, it is possible to deduce if the detected main peak is in fact associated with the satellite that is being looked for.

Furthermore, the method of the invention influences the approach adopted to the design of the spreading sequences in CDMA systems. The design no longer necessarily makes it obligatory to minimize the intercorrelation functions between the spread spectrum signals associated with different satellites. Here the constraint may be relaxed simply by making the theoretical autocorrelation function and each of said theoretical intercorrelation functions different.

The method of the invention advantageously includes a step of determining said theoretical autocorrelation function as a function of time of said spread spectrum signal characteristic of said satellite that is being looked for.

The autocorrelation function can either be stored beforehand or determined each time that the method of the invention is executed.

Said step of comparing said correlation function with the theoretical autocorrelation function advantageously includes a step of comparing secondary peaks of each of said functions.

Said comparison step advantageously includes a step of calculating the correlation between said correlation function and said autocorrelation function.

Said spread spectrum signal is advantageously a signal modulating said signal with a known pseudorandom sequence replacing each bit of said signal.

In the event of non-validation of the detection of said correlation peak, said method advantageously includes the following steps:

a step of determining theoretical intercorrelation functions as a function of time between said spread spectrum signal characteristic of said satellite that is being looked for and each of the satellites other than said satellite that is being looked for, and a step of comparing said correlation function with each of said theoretical intercorrelation functions.

Each of said spread spectrum signals associated with a particular satellite is advantageously selected so that said autocorrelation function and each of said theoretical intercorrelation functions are different.

Each of said spread spectrum signals associated with a particular satellite is advantageously selected so that each of said theoretical intercorrelation functions is decorrelated.

The invention also provides a device for validating the detection of a correlation peak between:

a signal transmitted by a plurality of navigation satellites and received by an RNSS satellite radio navigation receiver, said signal corresponding to a sum of signals each sent by a satellite and each modulated by a spread spectrum signal characteristic of said satellite, and a local replica generated by said receiver of a spread spectrum signal characteristic of a satellite that is being looked for, said device including means for determining the correlation function as a function of time between said received signal and said local replica, said device being characterized in that it further includes means for comparing said correlation function with the theoretical autocorrelation function as a function of time of said spread spectrum signal characteristic of said satellite that is being looked for over the whole of the vector of the correlation function.

The validation device is integrated into the RNSS satellite radio navigation receiver and the means for determining the correlation function and the comparison means take the form of software means, for example.

Other features and advantages of the present invention will become apparent in the following description of one embodiment of the invention, which is given by way of illustrative and nonlimiting example.

In the following figures:

FIG. 1 represents a first correlation graph illustrating the operation of the method of the invention, FIG. 2 represents a second correlation graph illustrating the operation of the method of the invention.

FIG. 1 represents a first graph 1 illustrating the operation of the method of the invention. The graph 1 includes a solid line curve 3 representing the correlation function as a function of a time variable $\tau$ between a signal received by a GPS receiver from a plurality of satellites and a local replica of the satellite to which the receiver is seeking to synchronize. The curve 3 has:

a main peak 6 centered on a time $\tau_0$ that is assumed to be the synchronization time, secondary peaks 7.

The method of the invention verifies that the time $\tau_0$ is indeed the synchronization time.

To this end, the graph 1 includes, also as a function of the time variable $\tau$, a dashed line curve 2 representing the theoretical autocorrelation function of the spread spectrum signal characteristic of the satellite that is being looked for and producing a main correlation peak 4 centered on $\tau_0$. In other words, if $C_m(t)$ is the spread spectrum signal from the satellite m that is being looked for, the curve 2 representing a function $g(\tau)$ is given by the following formula:

$$g(\tau) = \int_{+\infty}^{-\infty} C_m(t - \tau_o) \cdot C_m(t - \tau) \cdot dt$$

The curve 2 also has secondary peaks 5.

Comparing the curves 2 and 3 shows that they have exactly the same secondary peaks 5 and 7. This may be confirmed by correlating the correlation function of the curve 3 with the autocorrelation function of the curve 2. Accordingly, in FIG.

1, the method of the invention validates the detection of a correlation peak associated with the synchronization time $\tau_0$.

In a similar way, FIG. 2 represents a second graph 10 that also illustrates the method of the invention. The graph 10 includes two curves 20 and 30 as a function of a time variable $\tau$.

The solid line curve 30 represents the correlation function as a function of the time variable $\tau$ between a signal received by a GPS receiver from a plurality of satellites and a local replica of the satellite to which the receiver is seeking to synchronize. Like the curve 3 in FIG. 1, the curve 30 has a main peak centered on a time $\tau_1$ and secondary peaks.

The dashed line curve 20 represents the theoretical autocorrelation function of the spread spectrum signal characteristic of the satellite that is being looked for, producing a main correlation peak also centered on $\tau_1$.

Unlike what is shown in FIG. 1, the curves 20 and 30 here have numerous different secondary peaks and are therefore not very correlated with each other. Consequently, the detection of the correlation peak associated with the synchronization time $\tau_1$ is not validated. The method of the invention points to a detection error, the correlation peak that has been found not corresponding to the satellite that is being looked for.

Here the peaks are signed. This implies coherent integration (no squaring of the correlation function). The invention also applies to non-coherent integration (squaring of the correlation function). The criterion will nevertheless be less discriminating because all the secondary peaks will be of the same sign and thus only the difference in the position of the peaks will affect the difference in resemblance.

Note that the method may be extended to determining the satellite to which the erroneous peak relates. It suffices for this to determine the theoretical intercorrelation functions as a function of the time $\tau$ between the spread spectrum signal characteristic of the satellite that is being looked for and each of the satellites other than the satellite that is being looked for. Each of the intercorrelation functions is then correlated with the correlation function of the curve 30; the best correlation obtained determines the corresponding satellite.

Of course, the invention is not limited to the embodiment that has just been described.

In particular, the invention has been described in the case of a GPS system but applies equally to any other RNSS system, such as a GLONASS or GALILEO type receiver.

The invention claimed is:

1. A method comprising:
    validating the detection of a correlation peak between:
    a signal transmitted by a plurality of navigation satellites and received by a radio navigation satellite system (RNSS) satellite radio navigation receiver, said signal corresponding to a sum of signals each sent by a satellite and each modulated by a spread spectrum signal characteristic of said satellite,
    a local replica generated by said RNSS satellite radio navigation receiver, said replica being the replica of a spread spectrum signal characteristic of a satellite that is being looked for,
    said method including a step of determining a correlation function (3) as a function of time between said received signal and said local replica,
    said method being characterized in that it further includes a step of comparing said correlation function (3) with a theoretical autocorrelation function (2) as a function of time of said spread spectrum signal characteristic of said satellite that is being looked for over the whole of a vector of the correlation function wherein comparing said correlation function (3) with the theoretical autocorrelation function (2) includes a step of comparing secondary peaks (5, 7) of each of said correlation and theoretical autocorrelation functions.

2. The method according to claim 1 characterized in that it includes a step of determining said theoretical autocorrelation function as a function of time of said spread spectrum signal characteristic of said satellite that is being looked for.

3. The method according to claim 1 characterized in that said comparison step includes a step of calculating the correlation between said correlation function and said autocorrelation function.

4. The method according to claim 1 characterized in that said spread spectrum signal is a signal modulating said signal with a known pseudorandom sequence replacing each bit of said signal.

5. The method according to claim 1 characterized in that, in the event of non-validation of the detection of said correlation peak, said method includes the following steps:
    a step of determining theoretical intercorrelation functions as a function of time between said spread spectrum signal characteristic of said satellite that is being looked for and each of the satellites other than said satellite that is being looked for, and
    a step of comparing said correlation function with each of said theoretical intercorrelation functions.

6. The method according to claim 5 characterized in that each of said spread spectrum signals associated with a particular satellite is selected so that said theoretical autocorrelation function and each of said theoretical intercorrelation functions are different.

7. The method according to claim 5 characterized in that each of said spread spectrum signals associated with a particular satellite is selected so that each of said theoretical intercorrelation functions is decorrelated.

8. An apparatus comprising:
    a device for validating the detection of a correlation peak between:
    a signal transmitted by a plurality of navigation satellites and received by a radio navigation satellite (RNSS) satellite radio navigation receiver, said signal corresponding to a sum of signals each sent by a satellite and each modulated by a spread spectrum signal characteristic of said satellite, and
    a local replica generated by said RNSS satellite radio navigation receiver of a spread spectrum signal characteristic of a satellite that is being looked for,
    said device including means for determining a correlation function (3) as a function of time between said received signal and said local replica,
    said device being characterized in that it further includes means for comparing said correlation function (3) with a theoretical autocorrelation function (2) as a function of time of said spread spectrum signal characteristic of said satellite that is being looked for over the whole of a vector of the correlation function wherein comparing said correlation function (3) with the theoretical autocorrelation function (2) includes a step of comparing secondary peaks (5, 7) of each of said correlation and theoretical autocorrelation functions.

* * * * *